US012649511B2

(12) United States Patent
Cimatti

(10) Patent No.: US 12,649,511 B2
(45) Date of Patent: Jun. 9, 2026

(54) STEER-BY-WIRE STEERING SYSTEM HAVING AN OFF-AXIS STEERING SYSTEM SUPPORT COLUMN

(71) Applicant: Hangzhou TsingWayne Technology Co., Ltd, Hangzhou City (CN)

(72) Inventor: Franco Cimatti, Pavullo nel Frignano (IT)

(73) Assignee: Hangzhou TsingWayne Technology Co., Ltd., Zhejiang (CN)

( * ) Notice: Subject to any disclaimer, the term of this patent is extended or adjusted under 35 U.S.C. 154(b) by 539 days.

(21) Appl. No.: 18/043,015

(22) PCT Filed: Aug. 27, 2021

(86) PCT No.: PCT/EP2021/073809
§ 371 (c)(1),
(2) Date: Feb. 24, 2023

(87) PCT Pub. No.: WO2022/043534
PCT Pub. Date: Mar. 3, 2022

(65) Prior Publication Data
US 2023/0303152 A1 Sep. 28, 2023

(30) Foreign Application Priority Data

Aug. 28, 2020 (EP) .................................... 20193266

(51) Int. Cl.
*B62D 5/00* (2006.01)
*B62D 1/10* (2006.01)
*B62D 1/187* (2006.01)

(52) U.S. Cl.
CPC ............... *B62D 5/006* (2013.01); *B62D 1/10* (2013.01); *B62D 1/187* (2013.01)

(58) Field of Classification Search
CPC .......... B62D 5/001; B62D 1/10; B62D 1/105; B62D 1/187; B60R 16/0207; B60Y 2400/83; B60Y 2410/102
See application file for complete search history.

(56) References Cited

U.S. PATENT DOCUMENTS

| | | | |
|---|---|---|---|
| 5,072,628 A | 12/1991 | Oki | |
| 8,994,521 B2* | 3/2015 | Gazit ....................... | B62D 1/28 |
| | | | 340/425.5 |

(Continued)

FOREIGN PATENT DOCUMENTS

| | | |
|---|---|---|
| CN | 111491848 | 8/2020 |
| EP | 1342639 A2 | 9/2003 |

(Continued)

OTHER PUBLICATIONS

Extended European Search Report for European Patent Application No. 23197389.2, mailed on Jan. 19, 2024, in 8 pages.

(Continued)

*Primary Examiner* — Zakaria Elahmadi
(74) *Attorney, Agent, or Firm* — JCIPRNET

(57) ABSTRACT

The present disclosure relates to a steering system comprising a rotatable steering wheel hub; a steering system support column including an off-axis section and an aligned section that are connected by a connection portion. The steering wheel hub is rotatably mounted on the aligned section, while the off-axis section is axially spaced from the steering wheel hub. The steering system comprises a torque feedback device including an electric machine having a rotor and a stator, the rotor being attached to the steering wheel hub so as to be rotatable with the steering wheel hub about the axis of rotation, and the stator being non-rotatably fixed to the aligned section of the steering system support column.

19 Claims, 7 Drawing Sheets

(56) References Cited

U.S. PATENT DOCUMENTS

| | | | | |
|---|---|---|---|---|
| 10,773,745 | B2 * | 9/2020 | Wilske | B62D 5/0403 |
| 11,046,359 | B2 * | 6/2021 | Shin | B62D 5/046 |
| 12,054,191 | B2 * | 8/2024 | Tochev | B62D 1/16 |
| 2003/0164060 | A1 * | 9/2003 | Menjak | B62D 5/006 |
| | | | | 74/552 |
| 2019/0016365 | A1 | 1/2019 | Swamidason et al. | |
| 2019/0135332 | A1 | 5/2019 | Cimatti | |
| 2019/0202496 | A1 * | 7/2019 | Menjak | B62D 15/0285 |

FOREIGN PATENT DOCUMENTS

| | | | | | |
|---|---|---|---|---|---|
| EP | 1342639 | A3 | 9/2003 | | |
| EP | 3476692 | A1 | 5/2019 | | |
| EP | 3620350 | | 3/2020 | | |
| JP | 2004182061 | | * 7/2004 | | B62D 5/006 |
| JP | 2006298223 | | 11/2006 | | |
| JP | 2007263693 | | 10/2007 | | |
| WO | WO 2009/063818 | A1 | 5/2009 | | |

OTHER PUBLICATIONS

International Search Report for International Application No. PCT/EP2021/073809, mailed on Dec. 2, 2021, in 12 pages.
Extended European Search Report for European Patent Application No. 20193266.2, mailed on Feb. 17, 2021, in 8 pages.
"Office Action of China Counterpart Application", issued on May 30, 2025, with English translation thereof, p. 1-p. 15.
"Office Action of Japan Counterpart Application", issued on Aug. 7, 2025, with English translation thereof, p. 1-p. 10.

* cited by examiner

STEER-BY-WIRE STEERING SYSTEM HAVING AN OFF-AXIS STEERING SYSTEM SUPPORT COLUMN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to a steer-by-wire steering system for a vehicle, in particular an automotive vehicle, comprising a steering system support column including an off-axis section.

Description of the Related Art

In the motor vehicle and truck industry there is an increasing interest in and use of drive-by-wire systems, in which mechanical components are replaced by electro-mechanical configurations. Progresses towards fully electric vehicles and autonomous vehicles further promote developments of drive-by-wire steering systems and increase the need for inventive concepts.

One specific subcategory of drive-by-wire systems relates to steer-by-wire steering systems that aim at replacing conventional mechanical components for transferring a driver's steering command from a steering wheel to the wheels with electro-mechanical configurations. Such electro-mechanical steer-by-wire configurations can partially or completely dispense with direct or indirect mechanical connections between the steering wheel and the steered wheels. Instead of using mechanical power transmission, the steering command is detected by a sensor arrangement and is transmitted via a control unit in form of a control signal to an electro-mechanical actuator that is configured to execute the steering command.

Steer-by-wire configurations open up entirely new possibilities regarding installation space, assembling of steering systems, safety and design concepts.

A steer-by-wire steering system is for example known from document US 2020/0070871 A which discloses a vehicle steering wheel assembly including a steering wheel, a control component, a rotation measuring component for measuring the rotation condition of the steering wheel, and a road sense simulator for applying a resistance torque to the rotation of the steering wheel according to the rotation condition of the steering wheel. A steering column is disposed under the steering wheel, in which the upper end of the steering column is connected to the steering wheel, and the lower end of the steering column is connected to the road sense simulator. The road sense simulator is fixed to the vehicle body of the vehicle. The rotation measuring component and the road sense simulator are both connected to the control component, and the control component controls the road sense simulator to apply the resistance torque to the rotation of the steering wheel according to measurement data of the rotation measuring component.

Further, documents JP 2019-214360 A discloses steer-by-wire type power steering device which is provided with a particular operation range limit regulation device for replacing the given mechanical end stop present in conventional steering systems.

Prior art steer-by-wire systems often have a complex structure and are limited in view of their functionality and their applicability and adaptability to different vehicle requirements.

SUMMARY

It is an object of the present disclosure to provide a steering system which has improved characteristics and overcomes at least some of the disadvantages of the prior art.

In particular, it is an object of the present disclosure to provide a steer-by-wire steering system that requires reduced installation space, while allowing a simple adjustability to driver's ergonomics.

These and other objects are addressed in the present disclosure.

The disclosure relates to a steering system for a vehicle, more precisely to a steer-by-wire steering system.

The steering system can comprise a steering wheel hub connected or connectable with a steering wheel. The steering wheel hub is rotatable about an axis of rotation. Consequently, the steering wheel if connected therewith is also rotatable about the axis of rotation together with the steering wheel hub. In particular, the steering wheel hub can be rotatably mounted on a steering system support column.

The steering system can comprise the steering wheel, which in some embodiments comprises a grip portion.

The steering wheel can be directly or indirectly mechanically attached to the steering wheel hub by fixing elements. For example, the fixing elements can be bolts, screws, rivets, nuts, bonding and/or swaging (pressing and/or deforming).

The steering system can comprise a torque feedback device including an electric machine having a rotor and a stator with stator windings, the rotor being fixedly attached to the steering wheel hub so as to be rotatable with the steering wheel hub about the axis of rotation, and the stator being fixedly attached to a non-rotatable component of the steering system. In other words, non-rotatable means that the stator is rotationally stationary or rotationally fixed relative to a vehicle body.

The rotor can be an outer rotor and the stator can be an inner stator.

With respect to the axis of rotation, the fixing elements can be arranged at different radial positions, i.e. radial heights, than the stator windings.

The steering system can comprise a rigid steering system support column including an off-axis section having a first longitudinal axis that is off-set, and in some embodiments parallel, to the axis of rotation and including an aligned section having a second longitudinal axis that corresponds to the axis of rotation. Corresponding to the axis of rotation can also be described as being aligned with or coaxial to the axis of rotation. The steering wheel hub can be rotatably mounted on the aligned section and can thus at least partially overlap the aligned section in an axial direction. The off-axis section can be axially spaced or displaced from the steering wheel hub.

The off-axis section and the aligned section can be integrally formed and connected by a connection portion. The connection portion being a rigid portion that can also be formed integrally, i.e. in a one piece form, with the off-axis section and the aligned section.

The steering system can comprise a steering wheel rotation limiting device for mechanically limiting rotation of the steering wheel hub, and thus of a steering wheel connected therewith. The steering wheel rotation limiting device can be configured to limit rotatability of the steering wheel hub in both circumferential directions about the axis of rotation. The steering wheel rotation limiting device can be configured to still allow rotation of the steering wheel hub of more than 360°. The steering wheel rotation limiting device can be arranged radially offset, and in some embodiments adjacent, to the steering wheel hub.

The steering wheel rotation limiting device can comprise a base being fixed to the or another non-rotatable component of the steering system. The base comprises two axially opposing end stop surfaces. The steering wheel rotation limiting device can comprise a sliding element being axially slidable parallel to the axis of rotation relative to the base and relative to the steering wheel hub between the two opposing end stop surfaces. In other words, the sliding element can slide back and forth between the two opposing end stop surfaces.

The sliding element can comprise a projection that engages a spiral groove formed on a circumferential surface, in some embodiments an outer circumferential surface, of the steering wheel hub so that rotation of the steering wheel hub causes axial movement of the sliding element. Consequently, abutment of the sliding element with one of the two end stop surfaces blocks further axial movement of the sliding element in one direction and thus blocks rotation of the steering wheel hub.

The steering wheel rotation limiting device can be attached to the off-axis section via a base of the steering wheel rotation limiting device and can engaging the steering wheel hub via a sliding element. Thus, the steering wheel rotation limiting device can extend axially towards the steering wheel hub.

According to an aspect, a steering system for a vehicle comprises a steering wheel hub connected or connectable with a steering wheel, wherein the steering wheel hub and thus also the steering wheel connected or connectable therewith are rotatable about an axis of rotation.

The steering system comprises a steering system support column including an off-axis section having a first longitudinal axis that is off-set, and in some embodiments parallel, to the axis of rotation and including an aligned section having a second longitudinal axis that corresponds to the axis of rotation. Corresponding to the axis of rotation can also be described as being aligned with or coaxial to the axis of rotation. The off-axis section and the aligned section can be integrally formed and connected by a connection portion. The connection portion can also be formed integrally with the off-axis section and the aligned section. Hence, the off-axis section, the aligned section and the connection portion are formed as a rigid one-piece component. The steering wheel hub is rotatably mounted on the aligned section and thus at least partially overlaps the aligned section in an axial direction. The off-axis section is axially spaced from the steering wheel hub.

The steering system comprises a torque feedback device including an electric machine having a rotor and a stator. The rotor is fixedly attached to the steering wheel hub so as to be rotatable with the steering wheel hub about the axis of rotation. The stator is non-rotatably fixed to the aligned section of the steering system support column.

In some embodiments, the aligned section can form a hub element that is stationary relative to the rotor and the steering wheel hub and that carries the inner stator of an outer rotor electric machine.

The new and advantageous structural design of the integrally formed, i.e. one-piece, steering system support column including an off-axis section and an aligned axis section in combination with the torque feedback device arranged on the aligned section provides optimized use of installation space, while allowing a simple adjustability to driver's ergonomics and at the same time reducing friction and inertia due to the torque generation/transmission.

Thus, the combination of the described steering system support column design and the torque feedback device contributes to a structurally optimized configuration.

The connection portion, which can also be formed integrally with the off-axis section and the aligned section, can extends transversally to both the first longitudinal axis and the second longitudinal axis.

The off-axis section, the aligned section and/or the connection portion can be tubular. In particular, each of the off-axis section, the aligned section and the connection portion can be tubular. The off-axis section, the aligned section and/or the connection portion can at least partially have a substantially rectangular or circular cross-section. Alternatively, the off-axis section, the aligned section and/or the connection portion can have any other cross-sectional shape. For example, the off-axis section, the aligned section and/or the connection portion can have an oval or polygon shaped cross-section. A polygon shaped cross-section can be advantageous in view of providing some flat surfaces to provide angular reference between an axially sliding part and a fixed part of a telescope arrangement, so as to prevent rotation with respect to each other around a first longitudinal axis. The shape of the cross-section of the off-axis section, the aligned section and the connection portion can be the same or can be different.

In an embodiment, the steering system support column can be attached to a vehicle body via a vehicle support column. The off-axis section of the steering system support column can be mounted in the vehicle support column so as to be translationally movable along its first longitudinal axis, non-rotatable and non-pivotable relative to the vehicle support column. This means that in this embodiment, the steering system support column and all components supported thereon are respectively displaceable/non-displaceable relative to the vehicle support column. The steering system support column can be attached to the vehicle support column by brackets, axial adjustment elements and/or vertical adjustment elements.

The support of the off-axis section of the steering system support column in the vehicle support column can be realized at a first end of the steering system support column opposite to a second end of the steering system support column on which the torque feedback device is arranged (i.e. spaced from the aligned section).

The configuration allows adjustability of the steering system to driver's ergonomics, while eliminating the need for a reduction gear train and shaft, thus reducing friction and inertia during torque generation and transmission for the steer-by-wire system.

The steering system support column can form an inner member of a tubular telescope arrangement and the vehicle support column can form an outer member of the tubular telescope arrangement. The inner member is mounted axially and translationally displaceable in the outer member of the tubular telescope arrangement.

The vehicle support column and thus the steering system, i.e. all further system components mounted on/attached to the steering system support column, can be adjustable relative to the vehicle body by being pivotable and/or radially displaceable relative to the vehicle body. Pivotability and/or radial displaceability can relate to a movement of at least a portion of the steering system support column along at least one cross axis that is transversal to the first longitudinal axis.

According to an embodiment, the steering system support column can comprise an opening, in some embodiments arranged in the off-axis section or in the connection portion, which provides access to electric machine phase connections and/or steering wheel angle sensor connections which connect the electric machine and/or at least one sensor with the electronic control unit. The sensor can be the steering wheel angle sensor. Thus, the steering wheel rotation limiting device, in particular a removably attached steering wheel rotation limiting device, can enable accessibility to electrical connections for service and maintenance purposes and can at the same time securely protect the electrical connection and components from damaging environmental influences.

According to an embodiment, the steering system can comprise an electronic control unit at least for controlling the torque feedback device and/or for receiving and transmitting sensor information, such as information from the steering wheel angle sensor. The electronic control unit can be arranged inside the off-axis section of the steering system support column, in some embodiments in an area adjacent to or following the connection portion. In this case, the electronic control unit can be arranged close to the stator windings of the torque feedback electric machine and/or close to sensor/s, such as the rotation angle sensor for measuring rotation of the electric machine rotor.

In an embodiment, the steering system can comprise auxiliary components which are arranged inside the aligned section of the steering system support column and thus inside the stator of the torque feedback electric machine. The auxiliary components can comprise an airbag module, switchgear controls, a driver display arrangement, and/or a wiring harness. By arranging the auxiliary components inside the steering system support column, installation space can be efficiently used, i.e. required overall installation space for the steering system can be reduced.

In an embodiment, the rotor can be an outer rotor and the stator can be an inner stator. Hence, the torque feedback device can be an outer rotor electric torque feedback machine. In this case, the rotor can be attached to an inner circumferential surface of the steering wheel hub. The stator can be attached to an outer surface of the steering system support column, more precisely to an outer circumferential surface of the aligned section. An outer rotor electric machine of the torque feedback device and its arrangement directly on the steering wheel hub and the aligned section eliminates the need for a reduction gear train and shaft and reduces unwanted friction and inertia. Consequently, system efficiency can be increased and installation space requirement can be reduced.

According to an embodiment, the aligned section of the steering system support column can be provided with a protruding flange portion that provides a first bearing surface for a first bearing arrangement arranged between the steering system support column and the steering wheel hub. In some embodiments, the protruding flange portion can be arranged in a transition region between the aligned section and the connection portion, i.e. an end portion of the aligned section facing away from a steering wheel connected or connectable with the steering system. The protruding flange portion provides a circular ring-shaped first bearing surface. By means of the protruding flange portion, the outer diameter of the main part of the aligned section can minimized, while still supporting the steering wheel hub having a substantially greater inner diameter.

The aligned section of the steering system support column can comprises a circular ring-shaped portion that provides a circular ring-shaped second bearing surface for a second bearing arrangement arranged between the steering system support column and the steering wheel hub. In some embodiments, the circular ring-shaped portion can be arranged at least in a region following or adjacent to the steering wheel connected or connectable with the steering system, in other words at least in a region facing away from the off-axis section and the connection portion. By means of the circular ring-shaped portion, the outer shape/contour of the main part of the aligned section can be freely chosen, while still rotatably supporting the steering wheel.

The first and the second bearing arrangement realize rotatable support of the steering wheel hub and a steering wheel connected therewith on the steering system support column.

In an embodiment, the steering system can comprise a steering wheel rotation limiting device for at least mechanically limiting rotation of the steering wheel hub in both circumferential directions about the axis of rotation. The steering wheel rotation limiting device can be attached to the off-axis section via a base of the steering wheel rotation limiting device and can engage the steering wheel hub via a sliding element.

The base of the steering wheel rotation limiting device comprises two axially opposing end stop surfaces, and the sliding element is axially slidable parallel to the axis of rotation relative to the base and relative to the steering wheel hub between the two opposing end stop surfaces. The sliding element can comprise a projection, in particular a spiral ridge, that engages a spiral groove formed on an outer circumferential surface of the steering wheel hub so that rotation of the steering wheel hub causes axial movement of the sliding element, and so that abutment of the sliding element with one of the two end stop surfaces blocks further movement of the sliding element and thus further rotation of the steering wheel hub.

The base of the steering wheel rotation limiting device can overlap the protruding flange portion, and thus the first bearing surface, in an axial direction with respect to the axis of rotation. Thus, an advantageous compact design of the steering system structure can be realized.

According to an aspect, a steering system for a vehicle comprises a steering wheel hub connected or connectable with a steering wheel, wherein the steering wheel hub and thus also the steering wheel connected or connectable therewith are rotatable about an axis of rotation.

The steering system comprises a torque feedback device including an electric machine having a rotor and a stator, the rotor being attached to the steering wheel hub so as to be rotatable with the steering wheel hub about the axis of rotation, and the stator being fixed to a non-rotatable component of the steering system.

The steering system comprises a steering wheel rotation limiting device for limiting rotation of the steering wheel hub. In particular, the steering wheel rotation limiting device is configured to mechanically limit or block rotation of the steering wheel hub in both circumferential directions about the axis of rotation. Thus, the steering wheel rotation limiting device is configured to at least mechanically limit or block rotation of the steering wheel connected with the steering wheel hub. The steering wheel rotation limiting device can still allow rotation of the steering wheel hub and the steering wheel of more than 360°. The steering wheel rotation limiting device is arranged radially offset to the steering wheel hub and in some embodiments in the vicinity of the steering wheel hub. The steering wheel rotation limiting device comprises a base that is fixed to the, or, in some embodiments, another, non-rotatable component of the steering system. The base comprises two axially opposing end stop surfaces, with respect to a longitudinal axis parallel to the axis of rotation. The steering wheel rotation limiting device further comprises a sliding element that is axially slidable parallel to the axis of rotation relative to the base and relative to the steering wheel hub. The sliding element is slidable back and forth between the two opposing end stop surfaces.

The sliding element comprises a projection that engages a spiral groove formed on a circumferential surface of the steering wheel hub so that rotation of the steering wheel hub causes axial movement of the sliding element, and so that abutment of the sliding element with one of the two end stop surfaces blocks movement of the sliding element and rotation of the steering wheel hub. The circumferential surface of the steering wheel hub that is provided with the spiral groove can be an outer circumferential surface. More precisely, upon rotation of the steering wheel hub the interaction and engagement of the projection and the spiral groove causes the spiral groove to drag the projection and thus to displace the sliding element. The sliding element can then slide unless it is blocked by one of the two end stop surfaces. Abutment of the sliding element with one of the two end stop surfaces blocks further movement of the sliding element in one direction and consequently, by the interaction between the projection and the spiral groove, also blocks further rotation of the steering wheel hub in one rotational direction. Hence, abutment of the sliding element with one of the two end stop surfaces limits/restricts/stops rotational movement of the steering wheel hub and of a steering wheel fixedly connected therewith. In other words, steering wheel rotation limiting device defines and restricts the maximum angle of rotation of the steering system about the axis of rotation.

The steering wheel rotation limiting device that limits rotation of the steering wheel hub based on an abutment of the sliding element with one of the two opposing end stop surfaces, while allowing rotation of the steering wheel hub of more than 360°, allows to avoid oversizing the electric machine of the torque feedback device as the electric machine does not need to provide a full stopping torque.

The steering wheel rotation limiting device that restricts rotation of the steering wheel hub based on an abutment of the sliding element with one of the two opposing end stop surfaces embodies a robust and reliable solution for providing a mechanical end stop function in a steer-by-wire system which does not include any natural end-stop structure.

Moreover, the base and sliding element configuration has a low complexity and can be easily manufactured and attached to the steering system.

The steering system comprising this steering wheel rotation limiting device can be flexibly integrated in different vehicle and can be simply adapted to different vehicle requirements.

The steering system can comprise the steering wheel.

In an embodiment, the base can comprise a compartment formed therein that accommodates the sliding element and thereby inhibits or blocks radial movement of the sliding element in a direction away from the steering wheel hub and inhibits or blocks lateral movement of the sliding element transversal to a direction of its axial movability. In other words, the compartment can be configured to only allow axial movement of the sliding element between the two opposing end stop surfaces. The compartment can be partially complementary to the sliding element so as to block radial movement of the sliding element in the direction away from the steering wheel hub and block lateral movement of the sliding element transversal to the direction of its axial movability. The compartment can be a cuboid recess having five side surfaces, of which two surfaces define the two end stop surfaces. Only the side of the cuboid recess that faces the steering wheel hub is not closed by a side surface, but is open to receive the sliding element and to allow engagement of the sliding element (the projection) with the spiral groove.

The base can be arranged radially adjacent to the steering wheel hub such that the base and the outer circumferential surface of the steering wheel hub completely enclose the compartment.

According to an embodiment, the steering system can be configured so that in a condition or position in which the sliding element abuts one of the two opposing end stop surfaces, the projection is still spaced from both end portions of the spiral groove, in some embodiments by a defined distance or a defined section of the spiral groove. Hence, restriction of rotation of the steering wheel hub is not caused by an interaction of a portion of the projection with an end portion of the spiral groove, but instead by an abutment of a surface of the sliding element with one of the two end stop surfaces. Thus, the abutting surface area can be increased, compared to known solutions, which prevents damage of the steering system, in particular of the spiral groove and the projection, even under influence of strong external forces.

The sliding element can have a substantially rectangular cross-sectional area. The projection can be a spiral ridge protruding from the sliding element towards the steering wheel hub. The spiral ridge can be adapted to the spiral groove, in particular with regard to a pitch of the spiral groove. The spiral ridge can be substantially complementary to a portion of the spiral groove.

An axial width of the sliding element can be adapted in accordance with one or more of the following parameters: a length of the spiral groove, a pitch of the spiral groove, a distance between the two opposing end stop surfaces, and a circumferential length of the steering wheel hub. By adapting or choosing the axial width of the sliding element, the maximum travel distance, i.e. the maximum axial movability, of the sliding element between the two end stop surfaces can be defined. Thus, by merely replacing the sliding element and adapting its axial width and the dimensions and geometry of the projection, the steering wheel rotation limiting device can be used flexibly for different vehicle configurations.

The steering wheel rotation limiting device can be attached to the, or, in some embodiments, the other, non-rotatable component of the steering system by screws, bolts, rivets, or an adhesive or can be welded to the or the other non-rotatable component of the steering system. An attachment by screws or bolts can be advantageous as the steering wheel rotation limiting device can thus be removably mounted on the steering system.

In an embodiment, the base of the steering wheel rotation limiting device can cover an opening in the or the other non-rotatable component that provides access to electrical connections connecting the electric machine and/or at least one sensor with an electronic control unit. The sensor can be a steering wheel angle sensor. Thus, the steering wheel rotation limiting device, in particular a removably attached steering wheel rotation limiting device, can enable accessibility to electrical connections for service and maintenance purposes and can at the same time securely protect the electrical connection and components from damaging environmental influences.

According to an embodiment, the steering system can further comprise a steering system support column. The steering system support column can be configured to connect the steering wheel hub and steering wheel with a vehicle body. The steering system support column can be rigid. The steering system support column can comprise an off-axis section having a first longitudinal axis that is off-set, and in some embodiments parallel, to the axis of rotation. The steering system support column can comprise an aligned section having a second longitudinal axis that corresponds to the axis of rotation. In other words, corresponding to the axis of rotation can means that the second longitudinal axis is aligned with/coaxial to the axis of rotation.

A respective steering system support column provides a new and advantageous structural design that is technically advantageous in view of space requirements, adjustability to driver's ergonomics and torque generation/transmission with reduced friction and inertia.

The combination of the described steering system support column design and the steering wheel rotation limiting device contributes to a structurally optimized configuration, in particular in view of reduced space requirements, robustness and reliability of the mechanical end stop integration and simple assembling of the steering system.

Further, the steering system support column having the off-axis section and the aligned section and the described structure of the steering wheel rotation limiting device together allow an optimized integration and attachment of the described steering wheel rotation limiting device.

The steering system support column can be formed integrally, i.e. in one piece. In particular, the off-axis section can be integrally connected with the aligned section by a connection portion extending transversally to both the first longitudinal axis and the second longitudinal axis.

The aligned section of the steering system support column can be the non-rotatable component to which the stator is attached and the off-axis section can be the other non-rotatable component to which the base of the steering wheel rotation limiting device is attached. Thus, the torque feedback device can be arranged in the region of the steering wheel hub and close to the steering wheel, in some embodiments directly on the steering wheel hub. This eliminates the need for a reduction gear train and shaft and reduces unwanted friction and inertia. Consequently, system efficiency can be increased.

In an embodiment, the steering system support column can be non-rotatable around its first longitudinal axis, but translationally displaceable along its first longitudinal axis relative to a vehicle body. Thus, the steering system support column can allow adjustability of the steering system in accordance with driver's ergonomic needs. The steering system support column can in some embodiments form an inner member of a tubular telescope arrangement. In this case, the steering system support column can be translationally displaceable relative to an outer member. The steering system support column can be non-rotatable and non-pivotable relative to the outer member. The outer member can connect the steering system support column with the vehicle body.

According to an embodiment, the steering wheel hub can be rotatably mounted on the aligned section and can thus at least partially overlap the aligned section in an axial direction. The off-axis section can be axially spaced from the steering wheel hub.

In an embodiment of the steering system, the rotor can be an outer rotor and the stator can be an inner stator. In this case, the rotor can be attached to an inner circumferential surface of the steering wheel hub. The stator can be attached to an outer surface of the steering system support column, more precisely to an outer circumferential surface of the aligned section.

In an embodiment, the torque feedback device can be configured to increase the torque feedback level when a minimum distance between the sliding element and one of the two end stop surfaces falls below a predetermined threshold value. In this case, rotation of the steering wheel hub/steering wheel can be decelerated to some extend before abutment of the sliding element with one of the two end stop surfaces completely and abruptly blocks further rotation of the steering wheel hub/steering wheel. A threshold can be defined with respect to each of the two end stop surfaces.

According to an aspect, a steering system for a vehicle comprises a steering wheel hub connected or connectable with a steering wheel, wherein the steering wheel hub and thus also the steering wheel connected or connectable therewith are rotatable about an axis of rotation.

The steering system comprises a torque feedback device including an electric machine having a rotor and a stator. The rotor is attached to the steering wheel hub so as to be rotatable with the steering wheel hub about the axis of rotation, and the stator is fixed to a non-rotatable component of the steering system.

The steering system comprises a steering system support column including an off-axis section having a first longitudinal axis that is off-set, and in some embodiments parallel, to the axis of rotation and including an aligned section having a second longitudinal axis that corresponds to the axis of rotation. Corresponding to the axis of rotation can also be described as being aligned with or coaxial to the axis of rotation. The steering wheel hub is rotatably mounted on the aligned section and can thus at least partially overlap the aligned section in an axial direction. More precisely, the steering wheel hub can be rotatably mounted on an outer circumferential surface of the aligned section. The off-axis section is axially spaced from the steering wheel hub. The steering system support column can be rigid and can be formed integrally, i.e. in a one piece form.

The steering system comprises a steering wheel rotation limiting device for limiting rotation of the steering wheel hub. In particular, the steering wheel rotation limiting device is configured to at least mechanically limit or block rotation of the steering wheel hub in both circumferential directions about the axis of rotation. Thus, the steering wheel rotation limiting device is configured to mechanically limit or block rotation of the steering wheel connected with the steering wheel hub. The steering wheel rotation limiting device can still allow rotation of the steering wheel hub and the steering wheel of more than 360°. The steering wheel rotation limiting device is attached to the off-axis section via a base of the steering wheel rotation limiting device and engaging the steering wheel hub via a sliding element. The steering wheel rotation limiting device thus extends axially towards the steering wheel hub and the sliding element extends radially towards the steering wheel hub. In some embodiments, the steering wheel rotation limiting device can be attached only to the off-axis section of the steering system support column.

A respective steering system support column provides a new and advantageous structural design that is technically advantageous in view of space requirements, adjustability to driver's ergonomics and torque generation/transmission with reduced friction and inertia.

The combination of the steering system support column and the steering wheel rotation limiting device contributes to a structurally optimized configuration, in particular in view of reduced space requirements, robustness and reliability of the mechanical end stop integration and simple assembling of the steering system.

Further, the steering system support column having the off-axis section and the aligned section and the described structure of the steering wheel rotation limiting device together allow an optimized integration and attachment of the described steering wheel rotation limiting device.

The off-axis section can be integrally connected with the aligned section by a connection portion extending transversally to both the first longitudinal axis and the second longitudinal axis.

The aligned section of the steering system support column can be the non-rotatable component to which the stator is attached. Thus, the torque feedback device can be arranged in the region of the steering wheel hub and close to the steering wheel, in some embodiments directly on the steering wheel hub. This eliminates the need for a reduction gear train and shaft and reduces unwanted friction and inertia. Consequently, system efficiency can be increased.

In an embodiment, the steering system support column can be non-rotatable around its first longitudinal axis, but can be translationally displaceable along its first longitudinal axis relative to a vehicle body. Thus, the steering system support column can allow adjustability of the steering system in accordance with driver's ergonomic needs. The steering system support column can in some embodiments form an inner member of a tubular telescope arrangement that is mounted axially displaceable in an outer member of the tubular telescope arrangement, i.e. translationally displaceable relative to the outer member. The steering system support column can be configured non-rotatable and non-pivotable relative to the outer member. The outer member can connect the steering system support column with the vehicle body.

According to an embodiment, the steering system can comprise an electronic control unit at least for controlling the torque feedback device and/or for receiving and transmitting sensor information, in particular from a steering wheel angle sensor of the steering system.

The electronic control unit can be arranged inside the off-axis section of the steering system support column. Thus, installation space can be efficiently used.

The base of the steering wheel rotation limiting device can cover an opening in the off-axis section of the steering system support column that provides access to electric machine phase connections and/or steering wheel angle sensor connections which connect the electric machine and/or at least one sensor with the electronic control unit. The sensor can be the steering wheel angle sensor. Thus, the steering wheel rotation limiting device, in particular a removably attached steering wheel rotation limiting device, can enable accessibility to electrical connections for service and maintenance purposes and can at the same time securely protect the electrical connection and components from damaging environmental influences.

The base of the steering wheel rotation limiting device can be attached to the off-axis section of the steering system support column by screws, bolts, rivets, or an adhesive or can be welded to the off-axis section of the steering system support column. An attachment by screws or bolts can provide a removable attachment on the steering system.

In an embodiment, the rotor can be an outer rotor and the stator can be an inner stator. In this case, the rotor can be attached to an inner circumferential surface of the steering wheel hub. The stator can be attached to an outer surface of the steering system support column, more precisely to an outer circumferential surface of the aligned section. An outer rotor electric machine of the torque feedback device and its arrangement directly on the steering wheel hub and the aligned section eliminates the need for a reduction gear train and shaft and reduces unwanted friction and inertia. Consequently, system efficiency can be increased and installation space requirement can be reduced.

According to an embodiment, the base of the steering wheel rotation limiting device can comprise two axially opposing end stop surfaces, and the sliding element can be axially slidable parallel to the axis of rotation relative to the base and relative to the steering wheel hub between the two opposing end stop surfaces.

The sliding element can comprise a projection, in particular a spiral ridge, that engages a spiral groove formed on an outer circumferential surface of the steering wheel hub so that rotation of the steering wheel hub causes axial movement of the sliding element, and so that abutment of the sliding element with one of the two end stop surfaces blocks further movement of the sliding element in one direction and thus further rotation of the steering wheel hub in one direction.

The base can comprise a compartment formed therein that accommodates the sliding element and thereby inhibits radial movement of the sliding element in a direction away from the steering wheel hub and lateral movement of the sliding element transversal to a direction of its axial displaceability. The compartment can only allow axial movement of the sliding element between the two opposing end stop surfaces.

The base can be arranged radially adjacent to the steering wheel hub such that the base and the outer circumferential surface of the steering wheel hub completely enclose the compartment.

The steering system can be configured so that in a condition or position in which the sliding element abuts one of the two opposing end stop surfaces, the projection is still spaced from both end portions of the spiral groove, in some embodiments by a defined distance or a defined section of the spiral groove. Hence, restriction of rotation of the steering wheel hub is not caused by an interaction of a portion of the projection with an end portion of the spiral groove, but instead by an abutment of a surface of the sliding element with one of the two end stop surfaces. Thus, the abutting surface area can be increased, compared to known solutions, which prevents damage of the steering system, in particular of the spiral groove and the projection, even under influence of strong external forces.

In an embodiment, the torque feedback device can be configured to increase the torque feedback level when a minimum distance between the sliding element and one of the two end stop surfaces falls below a predetermined threshold value. In this case, rotation of the steering wheel hub/steering wheel can be decelerated to some extend before abutment of the sliding element with one of the two end stop surfaces completely and abruptly blocks further rotation of the steering wheel hub/steering wheel. A threshold can be defined with respect to each of the two end stop surfaces.

According to an aspect, a steering system for a vehicle comprises a steering wheel and a steering wheel hub, wherein the steering wheel is mechanically attached to the steering wheel hub by fixing elements. In some embodiments, the steering wheel is directly and fixedly attached to the steering wheel hub. The fixing elements can be bolts and/or screws. In some embodiments, a total number of three to ten screws can be arranged in equal distances around an axis of rotation of the steering wheel and steering wheel hub.

The steering system comprises a steering system support column, wherein the steering wheel hub is rotatably mounted on the steering system support column, so that the steering wheel and the steering wheel hub are rotatable about an axis of rotation.

The steering system comprises a torque feedback device including an electric machine having an outer rotor and an inner stator with stator windings. The outer rotor is attached to the steering wheel hub so as to be rotatable with the steering wheel hub about the axis of rotation. In some embodiments, the outer rotor is fixed to an inner circumferential surface of the steering wheel hub. The inner stator is non-rotatably fixed to the steering system support column. In some embodiments, the inner stator is fixed to an outer circumferential surface of the steering system support column.

With respect to the axis of rotation, the fixing elements are arranged at different radial positions than the stator windings. In other words, the fixing elements are arranged at different radial heights compared to the stator windings when viewed with regard to the axis of rotation, i.e. the fixing elements have different radial distances from the axis of rotation than the stator windings.

Providing an outer rotor electric machine for the torque feedback device and arranging the fixing elements at different radial positions than the stator windings allows for an advantageous compact design of the steer-by-wire steering system that reduces the required installation space.

A portion of the fixing elements can axially overlap a portion of the stator windings with respect to the axis of rotation. In particular, a portion of each of the fixing elements or a portion of only one or particular fixing elements can axially overlap a portion of the stator windings with respect to the axis of rotation. Such an arrangement is possible by means of the arrangement of the fixing elements at different radial positions than the stator windings. Thus, at least portions of the fixing elements can be arranged parallel to the stator windings, which further contributes to a compact structure of the steering system.

According to an embodiment, the steering system can comprise a first bearing arrangement arranged between the steering system support column and the steering wheel hub for enabling rotation of the steering wheel hub relative to the steering system support column. The steering system can comprise a second bearing arrangement arranged between the steering system support column and the steering wheel hub for enabling rotation of the steering wheel hub relative to the steering system support column. The second bearing arrangement can be axially spaced from the first bearing arrangement with respect to the axis of rotation. The second bearing arrangement can be located closer to the steering wheel than the first bearing arrangement.

With respect to the axis of rotation, the first bearing arrangement can be arranged at a different radial position than the second bearing arrangement. Again, the wording "at a different radial position" can also be described as a different radial height when viewed with regard to the axis of rotation, i.e. with a different radial distance from the axis of rotation. Arranging the second bearing arrangement at a different radial position than the first bearing arrangement, namely closer to the axis of rotation allows for an overlapping arrangement of further components parallel to the second bearing arrangement, which further contributes to a compact design.

With respect to the axis of rotation, the fixing elements can be arranged at different radial positions than the first bearing arrangement; and/or the fixing elements can be arranged at different radial positions than the second bearing arrangement. Such arrangements can also enable an overlapping/parallel arrangement of components of the steering system, which further contributes to a compact design and reduced installation space requirements of the steering system.

In an embodiment, the steering system support column, in particular an aligned section of the steering system support column, can be provided with an outwardly protruding flange portion that provides a circular ring-shaped first bearing surface for the first bearing arrangement. The protruding flange portion that protrudes from an outer circumferential surface of the steering system support column, is in some embodiments arranged in a transition region between the aligned section and a connection portion of the steering system support column. By means of the protruding flange portion, the outer diameter of the main part of the aligned section can minimized, while still supporting the steering wheel hub having a substantially greater inner diameter.

The steering system support column, in particular the aligned section of the steering system support column, can be provided with a circular ring-shaped portion that provides a circular ring-shaped second bearing surface for the second bearing arrangement. The circular ring-shaped portion providing the second bearing surface can have a substantially smaller outer diameter that the protruding flange portion. The circular ring-shaped portion can be provided at least in a region following or adjacent to the steering wheel, i.e. at least in a region facing away from the off-axis section. By means of the circular ring-shaped portion, the outer shape/contour of the main part of the aligned section can be freely chosen, while still rotatably supporting the steering wheel.

In an embodiment, the fixing elements can axially overlap the second bearing arrangement with respect to the axis of rotation. The fixing elements can partially or completely overlap the second bearing arrangement. This further contributes to a compact design and reduced installation space requirements of the steering system.

The steering wheel hub can be provided with an inwardly protruding flange portion that provides a counter bearing surface for the second bearing arrangement, the counter bearing surface substantially opposing the second bearing surface. Inwardly protruding means that the inwardly protruding flange portion protrudes towards the steering system support column, i.e. towards the axis of rotation. The counter bearing surface forms a circular ring-shaped portion for supporting the second bearing arrangement.

The inwardly protruding flange portion of the steering wheel hub can be formed in a region of the steering wheel hub that is arranged axially between the steering wheel and the electric machine of the torque feedback device. Hence, the electric machine can be covered towards the steering wheel by the inwardly protruding flange portion.

Blind holes can be formed in the steering wheel hub in the region of the inwardly protruding flange portion, in some embodiments in the inwardly protruding flange portion, wherein the fixing elements extend into the blind holes for fastening the steering wheel to the steering wheel hub. The blind holes can be provided with internal threads so as to secure fixing elements in form of screws or threaded bolts therein.

In an embodiment, the fixing elements can be arranged at substantially the same radial positions as the outer rotor of the torque feedback device, with respect to the axis of rotation. Such a configuration can limit the radial extension of the steering system in the region of the torque feedback device.

According to an embodiment, the steering wheel can comprise a rigid steering wheel armature including through bores, wherein the fixing elements extend through the through bores into the steering wheel hub for fastening the steering wheel to the steering wheel hub. In some embodiments, the through bores can be aligned with the blind holes in the steering wheel hub.

According to an embodiment, the steering system support column can comprise the off-axis section having a first longitudinal axis that is off-set, and in some embodiments parallel, to the axis of rotation and can include the aligned section having a second longitudinal axis that corresponds to the axis of rotation. The off-axis section and the aligned section can be integrally formed and connected by a connection portion. The steering wheel hub can be rotatably mounted on the aligned section and thus at least partially overlaps the aligned section in an axial direction, while the off-axis section is axially spaced from the steering wheel hub. The stator can be non-rotatably fixed to the aligned section of the steering system support column.

In an embodiment, the steering system can comprise a steering wheel rotation limiting device for limiting rotation of the steering wheel hub. In particular, the steering wheel rotation limiting device can be configured to at least mechanically limit or block rotation of the steering wheel hub in both circumferential directions about the axis of rotation. Thus, the steering wheel rotation limiting device can be configured to mechanically limit or block rotation of the steering wheel connected with the steering wheel hub. The steering wheel rotation limiting device can still allow rotation of the steering wheel hub and the steering wheel of more than 360°. The steering wheel rotation limiting device can be attached to the off-axis section via a base of the steering wheel rotation limiting device and can engage the steering wheel hub via a sliding element. The steering wheel rotation limiting device can thus extend axially towards the steering wheel hub and the sliding element can extend radially towards the steering wheel hub. In some embodiments, the steering wheel rotation limiting device can be attached only to the off-axis section of the steering system support column.

Even though some of the features, functions, embodiments, technical effects and advantages have been described with regard to one aspect, it will be understood that these features, functions, embodiments, technical effects and advantages can be combined with one another also applying to other embodiments and aspects.

BRIEF DESCRIPTION OF THE DRAWINGS

For a better understanding of embodiments of the disclosure and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
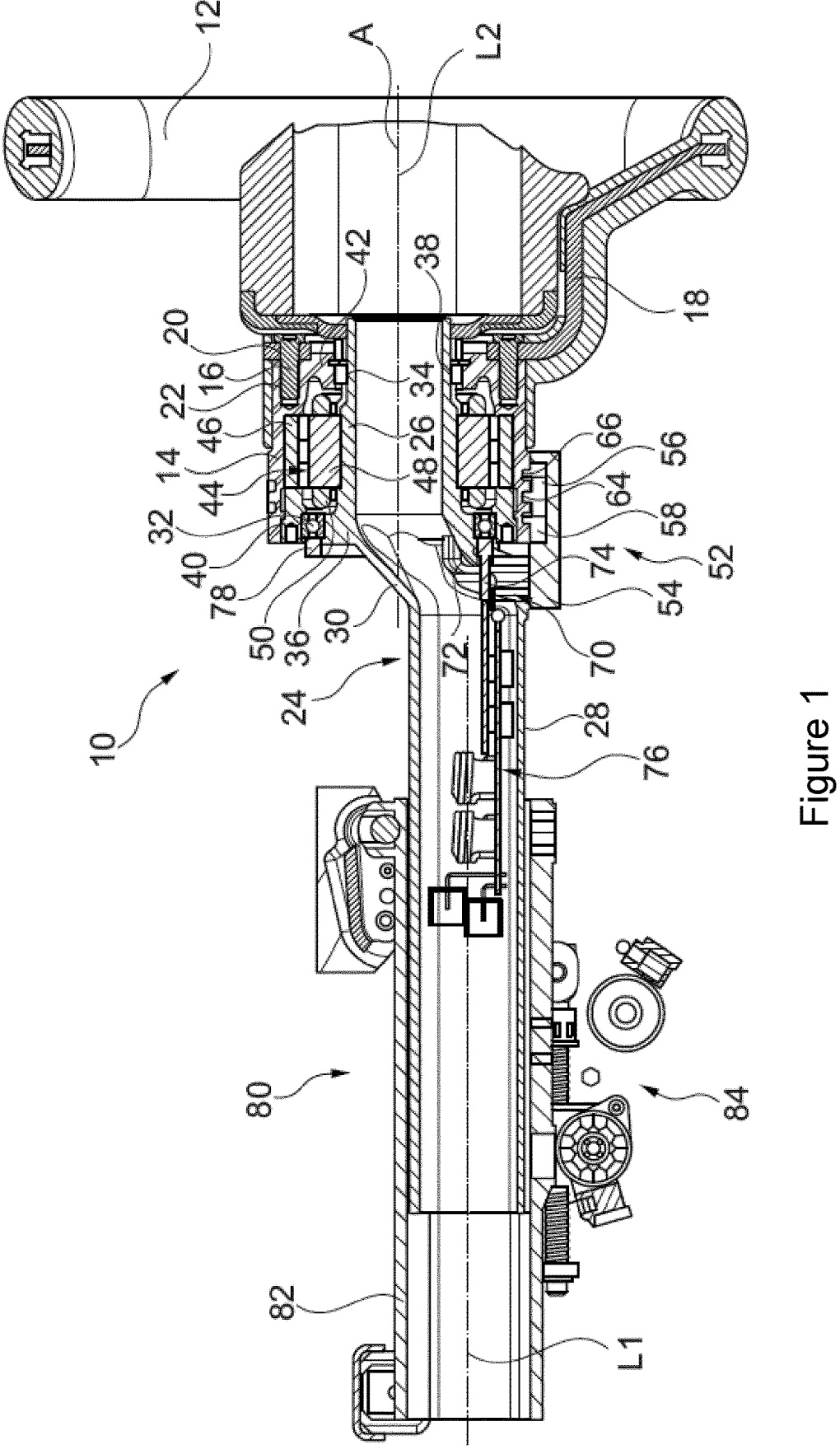
FIG. 1 shows a schematic sectional view of a steering system according to an embodiment.
Figure 2:
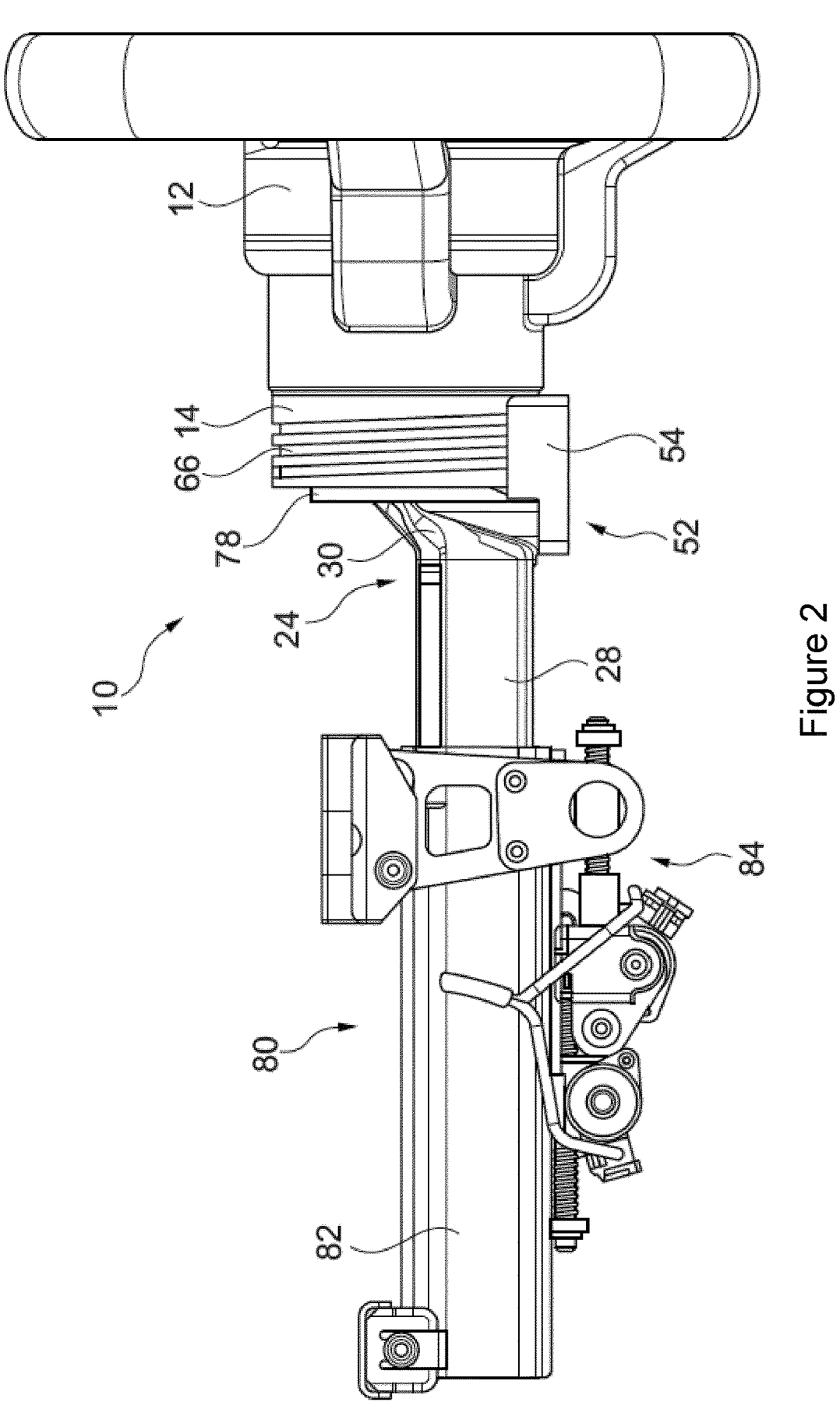
FIG. 2 shows a schematic side view of the steering system of FIG. 1.

Various examples of embodiments of the present disclosure will be explained in more detail by virtue of the following embodiments illustrated in the figures and/or described below.

FIGS. 1 to 6 show schematic views of a steering system 10 for a road vehicle according to an embodiment. As can be seen in FIGS. 1 to 6, the steering system 10 is a steery-by-wire steering system that has no direct mechanical connection for transferring a driver's steering commands from a steering wheel 12 of the steering system 10 to the wheels (not shown) of the vehicle. Instead, the mechanical connections are replaced by an electro-mechanical arrangement.

In addition to the steering wheel 12, the steering system 10 comprises a steering wheel hub 14 mechanically connected with the steering wheel 12. The steering wheel hub 14 and the steering wheel 12 are non-rotatable relative to each other, but can be rotated together about an axis of rotation A. The steering wheel 12 is removably attached to the steering wheel hub 14 in a non-rotatable manner by fixing elements 16 in form of screws. More precisely, the steering wheel 12 is provided with an internal armature 18, wherein the fixing elements 16 extend through through bores 20 of the internal armature 18 into internally threaded blind holes 22 provided in the steering wheel hub 14.

The steering wheel hub 14 is rotatably supported on a rigid steering system support column 24 of the steering system 10, more precisely on an aligned section 26 of the steering system support column 24. Besides the aligned section 26, the steering system support column 24 comprises an off-axis section 28 formed e.g. integrally with the aligned section 26. The off-axis section 28 is axially spaced from the aligned section 26 and from the steering wheel hub 14, while the steering wheel hub 14 overlaps and is located coaxial to the aligned section 26. The off-axis section 28 has a first longitudinal axis L1 that is off-set and parallel to the axis of rotation A. The aligned section 26 has a second longitudinal axis L2. The aligned section 26 of the steering system support column 24 is aligned with or coaxial to the steering wheel hub 14 and to the steering wheel 12, i.e. the second longitudinal axis L2 corresponds to the axis of rotation A.

The off-axis section 28 and the aligned section 26 are integrally formed in this example and are connected by a connection portion 30 extending transversally to both the first longitudinal axis L1 and the second longitudinal axis L2.

The steering wheel hub 14 is rotatably mounted on the aligned section 26 of the steering system support column 24 by a first bearing arrangement 32 and a second bearing arrangement 34, the second bearing arrangement 34 being axially spaced from the first bearing arrangement 32. For example, the first bearing arrangement 32 and/or the second bearing arrangement 34 can be a ball bearing or a roller bearing.

The first bearing arrangement 32 is supported on a protruding flange portion 36 of the aligned section 26 of the steering system support column 24, which protrudes radially outward from the outer circumferential surface of the aligned section 26. The protruding flange portion 36 provides a circular ring-shaped first bearing surface for supporting the first bearing arrangement 32. The protruding flange portion 36 is arranged in the vicinity of the connection portion 30, i.e. in a transition region between the aligned section 26 and the connection portion 30. Consequently, the first bearing arrangement 32 is axially located at a first end portion of the aligned section 26 oriented towards the connection portion 30.

The second bearing arrangement 34 is supported on a circular ring-shaped portion 38 of the aligned section 26 of the steering system support column 24. The circular ring-shaped portion 38 is formed in an area of the aligned section 26 following the steering wheel 12 and extending towards the protruding flange portion 36. The circular ring-shaped portion 38 provides a second bearing surface for the second bearing arrangement 34. Thus, the second bearing arrangement 34 is axially located at a second end portion of the aligned section 26 opposing the first end portion.

The first bearing arrangement 32 is mounted between the protruding flange portion 36 of the aligned section 26 and the steering wheel hub 14 via a support bushing 40 arranged between the first bearing arrangement 32 and the inner circumferential surface of the steering wheel hub 14.

The second bearing arrangement 34 is mounted directly between the circular ring-shaped portion 38 of the aligned section 26 and the steering wheel hub 14. To this, the steering wheel hub 14 is provided with an inwardly protruding flange portion 42 that provides a counter bearing surface for the second bearing arrangement 34. At the same time, the inwardly protruding flange portion 42 covers components located inside the steering wheel hub 14. As can be seen in FIG. 1, the blind holes 22 for receiving the fixing elements 16 extend into or through the inwardly protruding flange portion 42.

The steering system 10 further comprises a torque feedback device 44 including an electric machine having a rotor 46 and a stator 48 with stator windings 50. The torque feedback device 44 can be operated to produce resistance torque to the rotation of the steering wheel 12 so as to simulate the resistance torque present in conventional steering systems. In other words, the torque produced by the torque feedback device 44 can counteract the rotational force applied to the steering wheel 12 by a driver.

In the shown embodiment, the electric machine is an outer rotor electric machine comprising an outer rotor 46 and an inner stator 48. The rotor 46 is fixed to an inner circumferential surface of the steering wheel hub 14. Thus, the rotor 46 is rotatable together with the steering wheel hub 14 about the axis of rotation A. The rotor 46 is non-rotatable relative to the steering wheel hub 14. The stator 48 is fixed to the rotatably stationary (i.e. non-rotatable) aligned section 26 of the steering system support column 24. Thus, the steering wheel hub 14 and the rotor 46 can rotate together around the stator 48 and the aligned section 26.

The electric machine of the torque feedback device 44 is arranged inside the steering wheel hub 14. The torque feedback device 44 is radially enclosed and thus covered by the steering wheel hub 14 (the inner circumferential surface of the steering wheel hub 14) and the aligned section 26 of the steering system support column 24 (the outer circumferential surface of the aligned section 26). The torque feedback device 44 is axially located between the protruding flange portion 36 of the aligned section 26 and the circular ring-shaped portion 38 of the aligned section 26. The torque feedback device 44 is axially enclosed and thus covered by the protruding flange portion 36 of the aligned section 26, the first bearing arrangement 32 and the support bushing 40 on one side and by the inwardly protruding flange portion 42 of the steering wheel hub 14 and the second bearing arrangement 34 on the other side.

The arrangement, configuration and support of the steering wheel hub 14, the steering wheel 12, the torque feedback device 44 and the steering system support column 24 provides a very compact structure. More precisely, as shown in FIG. 1, various components are arranged at least partially parallel to each other, with respect to their radial and/or axial arrangement.

Namely, the fixing elements 16 are arranged at different radial positions, i.e. different radial heights, than the stator windings 50, with respect to the axis of rotation A. Hence, the fixing elements 16 and the blind holes 22 at least partially overlap the stator windings 50 in the axial direction. The stator windings 50 can be arranged closer to the axis of rotation A than the fixing elements 16.

Further, the second bearing arrangement 34 is arranged at a different radial position, i.e. a different radial height, than the stator windings 50 and at a different radial position, i.e. a different radial height, than the fixing elements 16, with respect to the axis of rotation A. In the shown embodiment, the fixing elements 16 overlap the second bearing arrangement 34 in the axial direction. The second bearing arrangement 34 can be arranged closer to the axis of rotation A than the stator windings 50 and can be arranged closer to the axis of rotation A than the fixing elements 16.

Further, the first bearing arrangement 32 is arranged at a different radial position, i.e. a different radial height, than the second bearing arrangement 34 and at a different radial position, i.e. a different radial height, than the fixing elements 16, with respect to the axis of rotation A. The first bearing arrangement 32 is arranged at a similar radial position as the start windings 50, with respect to the axis of rotation A. The first bearing arrangement 32 can be arranged closer to the axis of rotation A than the stator fixing elements 16 and can be spaced farther from to the axis of rotation A than the second bearing arrangement 34.

The fixing elements 16 are arranged at similar radial positions as the outer rotor 46 of the torque feedback device 44, with respect to the axis of rotation A. This limits the radial extension of the steering system 10 in the region of the torque feedback device 44.

The steering system 10 further comprises a steering wheel rotation limiting device 52 for limiting rotation of the steering wheel hub 14 and the steering wheel 12. The steering wheel rotation limiting device 52 is fixed to the steering system support column 24 and is arranged radially offset to the steering wheel hub 14, more precisely adjacent to the outer circumferential surface of the steering wheel hub 14. The steering wheel rotation limiting device 52 is non-rotatable relative to the steering system support column 24.

The steering wheel rotation limiting device 52 comprises a base 54 and a sliding element 56 arranged inside a compartment 58 formed in the base 54. The sliding element 56 is axially slidable relative to the base 54 and relative to the steering wheel hub 14. The sliding element 56 can slide between the two opposing end stop surfaces 60, 62 (see FIGS. 7A to 9C) of the steering wheel rotation limiting device 52. The sliding element 56 comprises a projection 64 that engages a spiral groove 66 formed on the outer circumferential surface of the steering wheel hub 14. By the interaction of the projection 64 and the spiral groove 66, rotation of the steering wheel hub 14 causes axial movement of the sliding element 56. Likewise, abutment of the sliding element 56 with one of the two end stop surfaces 60, 62 blocks further movement of the sliding element 56 in a certain direction and thus blocks further rotation of the steering wheel hub 14 in a certain direction of rotation. Hence, the steering wheel rotation limiting device 52 is configured to restrict rotation of the steering wheel hub 14 and of the steering wheel 12 connected therewith.

The base 54 of the steering wheel rotation limiting device 52 is fixed to the off-axis section 28 of the steering system support column 24 by screws 68 (see FIGS. 5 to 9C). The steering wheel rotation limiting device 52, more precisely the base 54, extends in the axial direction from the off-axis section 28 of the steering system support column 24 to the steering wheel hub 14 so that the compartment 58 is arranged between and enclosed by the base 54 and the outer circumferential surface of the steering wheel hub 14.

Functions and further details of the steering wheel rotation limiting device 52 will be described in the context of FIGS. 7A to 9C.

The base 54 of the steering wheel rotation limiting device 52 covers an opening 70 configured in the off-axis section 28 of the steering system support column 24. More precisely, the opening 70 is arranged in another transition region between the off-axis section 28 and the connection portion 30. The opening 70 provides access to electric machine phase connections 72 and to electric steering wheel angle sensor connections 74 for service and maintenance purposes. The electric machine phase connections 72 connect the electric machine of the torque feedback device 44 with a control unit/control electronics 76. The electric steering wheel angle sensor connections 74 connect a steering wheel angle sensor 78 with the control unit/control electronics 76.

The control unit 76 is arranged inside the hollow tubular off-axis section 28 of the steering system support column 24. More precisely, the control unit 76 is arranged in a portion of the off-axis section 28 close to the connection portion 30 so as to locate the control unit 76 and the electric machine close to each other.

The steering wheel angle sensor 78 is configured to measure a present steering angle and thus to detect the driver's steering command that is to be transmitted electronically to actuator/s for actuating/steering the wheels in line with this command. The steering wheel angle sensor 78 is arranged adjacent or lateral to the first bearing arrangement 32

The steering system support column 24 forms an inner member of a tubular telescope arrangement 80. The outer member of the tubular telescope arrangement 80 is embodied by a vehicle support column 82. In particular, the off-axis section 28 is mounted axially slidable inside the outer member/vehicle support column 82 of the tubular telescope arrangement 80. Thus, the steering system support column 24 is translationally displaceable relative to the vehicle support column 82 and relative to a vehicle body, but is non-rotatable and non-pivotable relative to the vehicle support column 82.

The steering system support column 24 is connected to the verhicle vehicle body (not shown) via the vehicle support column 82 by brackets, axial adjustment elements and vertical adjustment elements 84. Consequently, the steering system support column 24 and all components supported thereon are only translationally displaceable with respect to the first longitudinal axis L1 independent of the vehicle support column 82. Further, the steering system support column 24 and all components supported thereon are radially displaceable/pivotable relative to the vehicle body dependent on the vehicle support column 82, i.e. the adjustability/displaceability of the vehicle support column 82.

The steering system support column 24 has a hollow tubular shape. The steering system support column 24 is formed as a rigid one-piece component and is in some embodiments made of metal. As can be seen in FIGS. 3 to 6, which show different perspective views of the steering system 10, at least the off-axis section 28 of the steering system support column 24 has a substantially rectangular cross-sectional area. Such a shape can be particularly advantageous for accommodating and attaching the control unit 76. Similar to the off-axis section 28, the vehicle support column 82 that forms the tubular telescope arrangement 80 together with the off-axis section 28 has a substantially rectangular cross-sectional area.

The connection portion 30 of the steering system support column 24 forms a tapering transition that tapers from the off-axis section 28 towards the aligned section 26. The aligned section 26 has a smaller diameter than the off-axis section 28. The aligned section 26 has a substantially circular cross-sectional area.

Figures 3, 4:
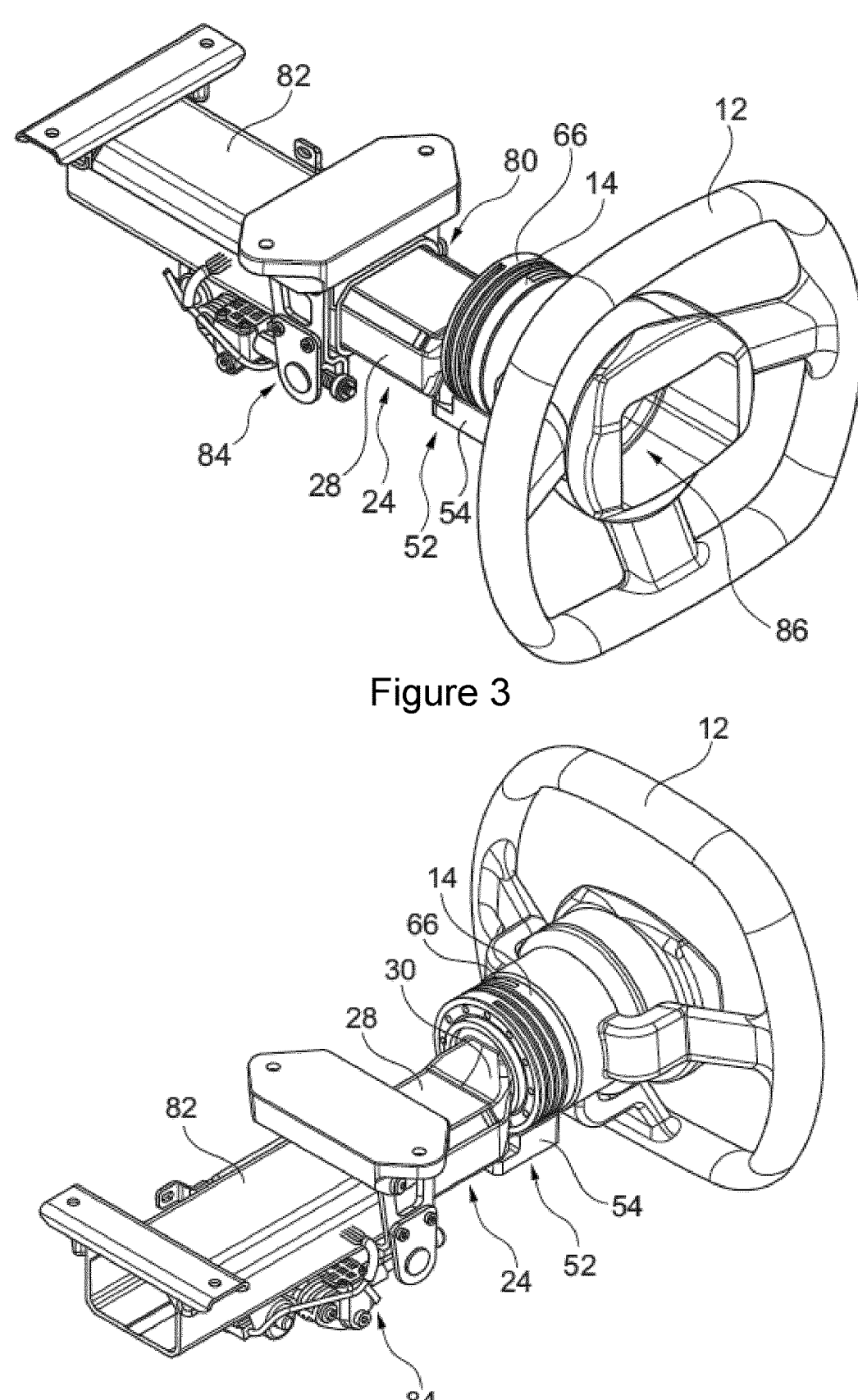
FIG. 3 shows a schematic perspective view of the steering system of FIG. 1.
FIG. 4 shows another schematic perspective view of the steering system of FIG. 1.
Figure 5:
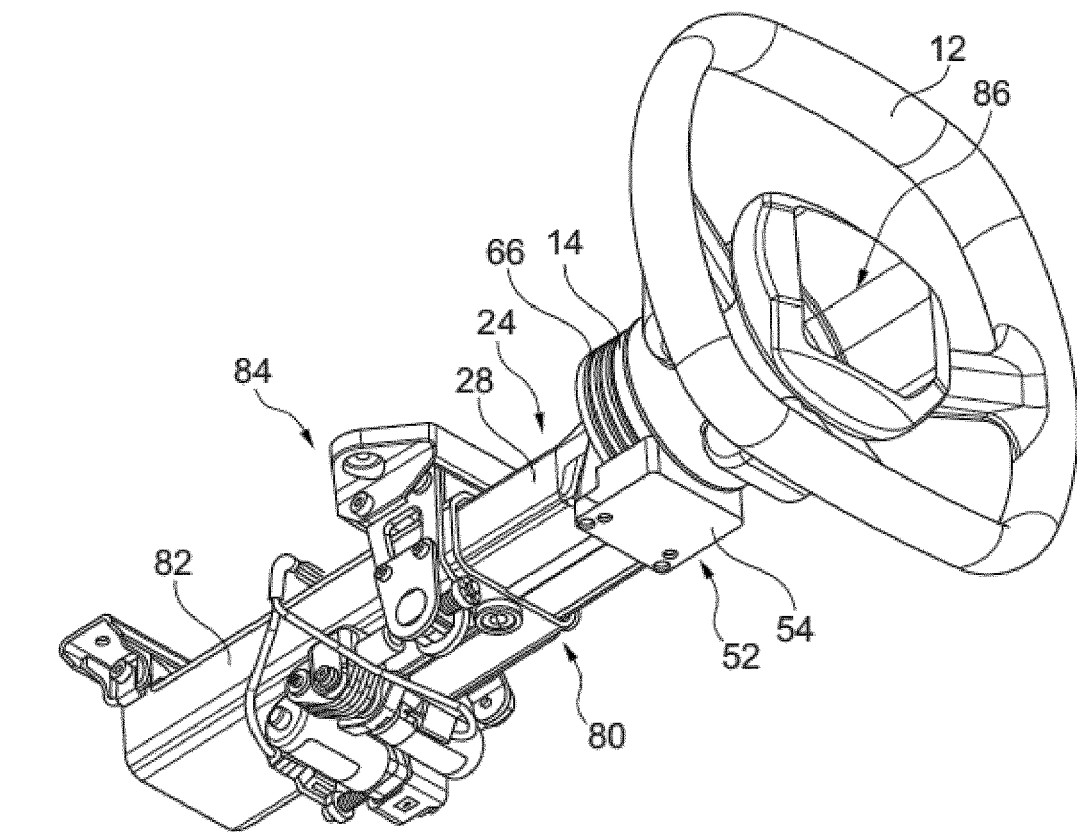
FIG. 5 shows still another schematic perspective view of the steering system of FIG. 1.
Figure 6:
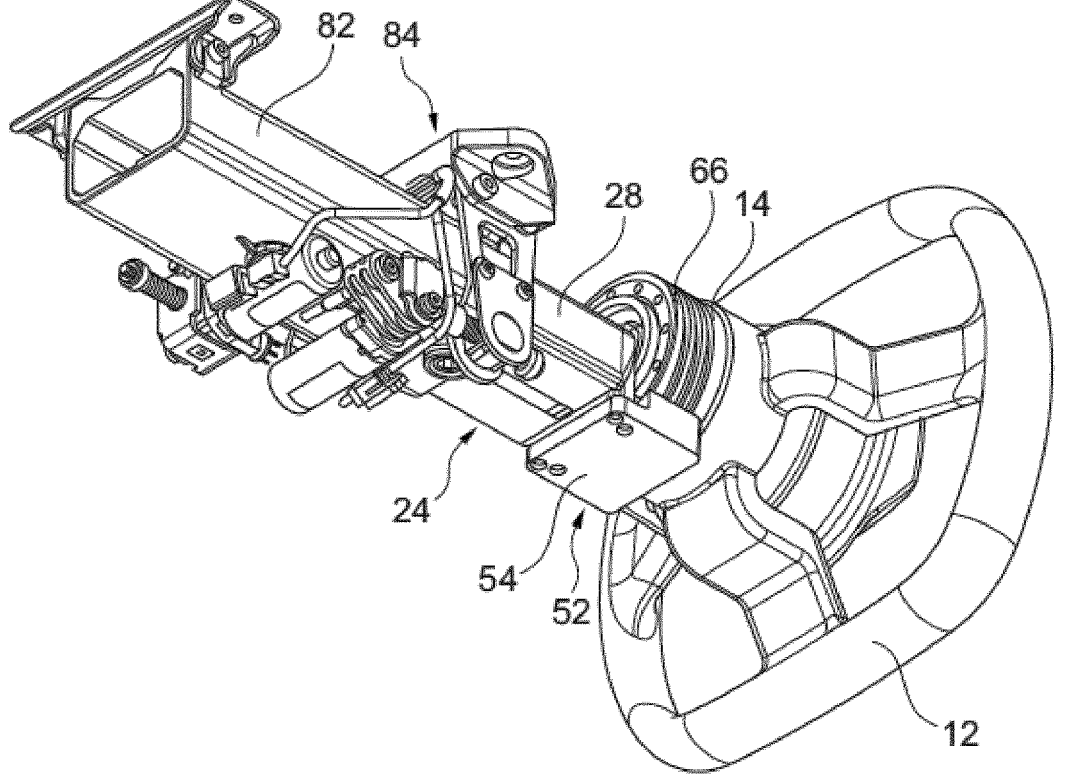
FIG. 6 shows a further schematic perspective view of the steering system of FIG. 1.

As can be further seen in FIGS. 3 and 5 in conjunction with FIG. 1, the steering wheel 12 is provided with an internal space 86 for accommodating auxiliary components (not shown), such as an airbag module, switchgear controls, a driver display arrangement, etc. These auxiliary components as well as further auxiliary components, such as a wiring harness, can extend into the hollow, tubular aligned section 26. The auxiliary components as well as the further auxiliary components can thus be arranged in and/or attached to the inside of the aligned section 26 of the steering system support column 24.

Figure 7:
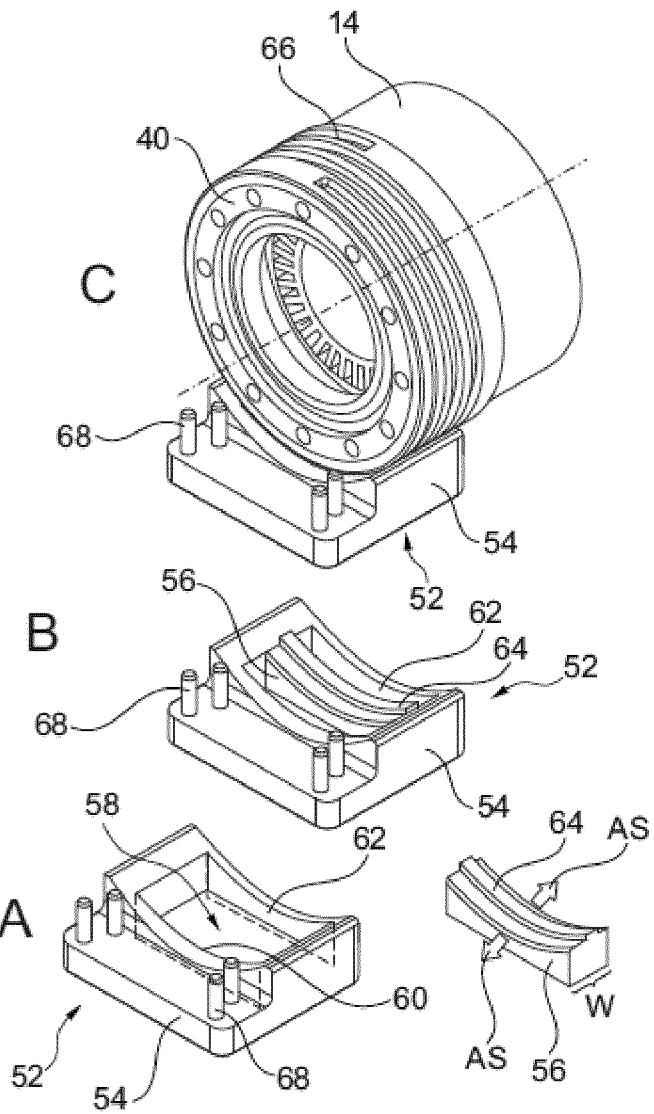
FIGS. 7A to 7C show the steering wheel rotation limiting device of the steering system in a schematic exploded state, in an assembled state and in a mounted state.
Figure 8:
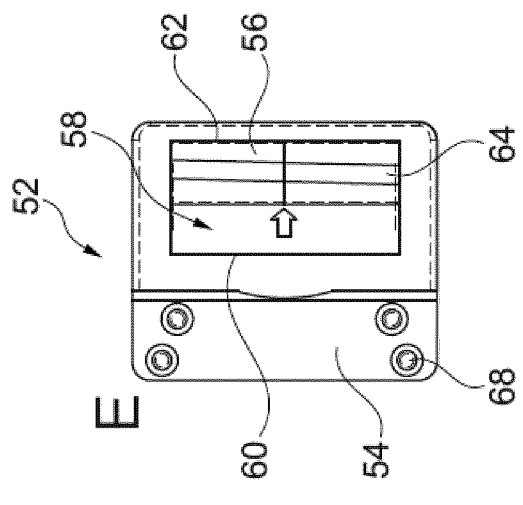
FIGS. 8A to 8F show schematic views of the steering wheel rotation limiting device for illustrating the functional principle of the steering wheel rotation limiting device.
Figure 8:
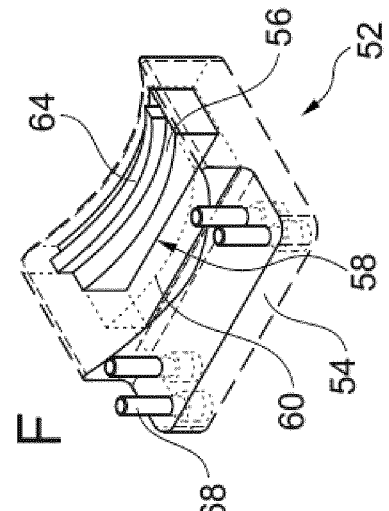
Figure 8:
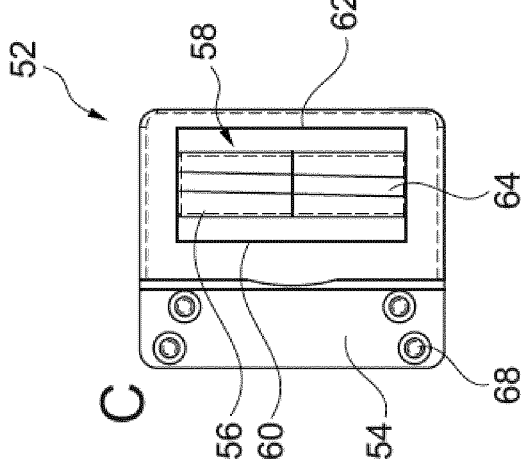
Figure 8:
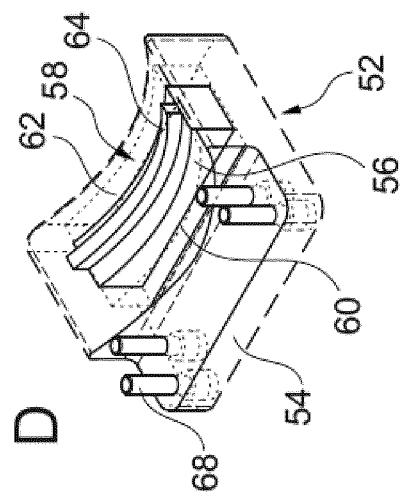
Figure 8:
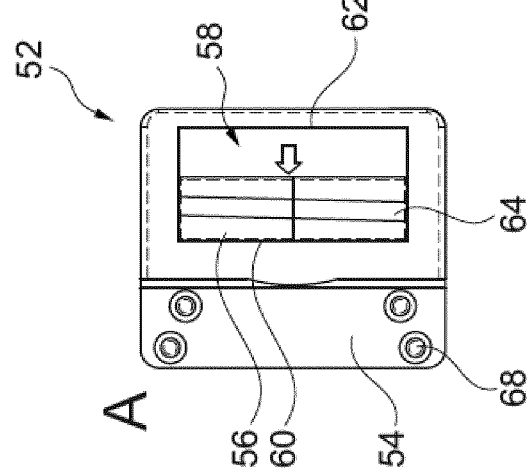
Figure 8:
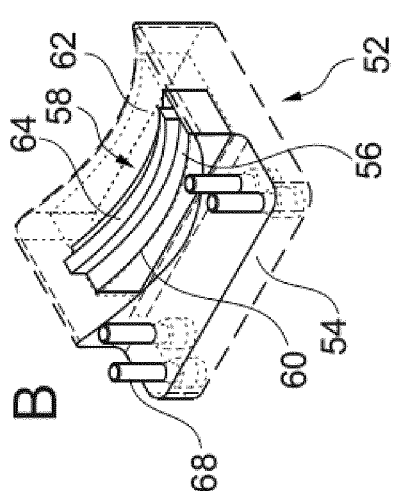
Figure 9:
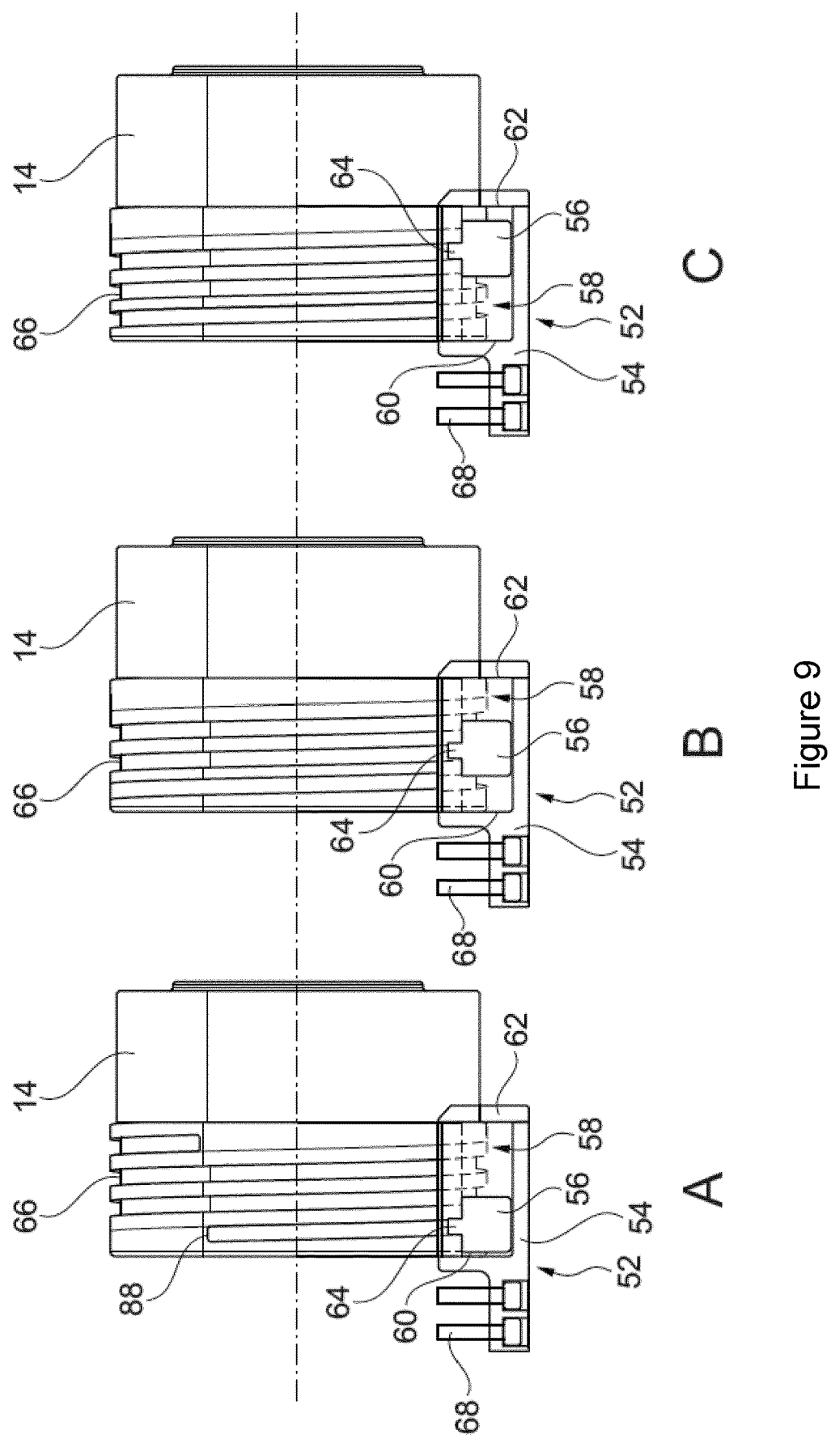
FIGS. 9A to 9C show schematic views of the steering wheel rotation limiting device and the steering wheel hub for illustrating the functional principle of the steering wheel rotation limiting device.

FIGS. 7A to 9C serve to disclose details concerning the function and configuration of the steering wheel rotation limiting device 52. FIG. 7A shows the components of the steering wheel rotation limiting device 52 separately, i.e. in an exploded view. FIG. 7B shows the components of the steering wheel rotation limiting device 52 in an assembled state. FIG. 7C shows) the steering wheel rotation limiting device 52 mounted to or in interaction with the steering wheel hub 14.

As can be seen in FIGS. 7A to 7C, four screws 68 extend through base 54 so as to securely fix the steering wheel rotation limiting device 52 to the steering system support column 24. The base 54 has a compartment 58 formed therein. Two axially opposing side surfaces of the compartment 58 constitute the end stop surfaces 60, 62. The compartment 58 is formed partially complementary to the sliding element 56 that can be arranged therein (see FIG. 7B). Thus, the compartment 58, more precisely the bottom and the lateral surfaces of the compartment 58, restricts movability of the sliding element 56 to an axial slidability between the two end stop surfaces 60, 62 (indicated by arrows AS). The two end stop surfaces 60, 62 limit the slidability of the sliding element 56 in the axial directions. When the sliding element 56 abuts one of the two end stop surfaces 60, 62, its further movement in the current direction is blocked and the sliding element 56 can only move in an opposite axial direction, i.e. towards the respective opposing end stop surface 60, 62. A surface oriented towards the steering wheel hub 14, in a mounted state, is curved and substantially complementary to a corresponding part of the outer circumferential surface of the steering wheel hub 14.

The sliding element 56 engages the spiral groove 66 formed in the outer circumferential surface of the steering wheel hub 14 via the projection 64. Projection 64 is formed as a spiral ridge, adapted to the shape and dimension of the spiral groove 66. The sliding element 56 interacts with the steering wheel hub 14 via the spiral groove 66. When the steering wheel 12 and consequently the steering wheel hub 14 rotate, the sliding element 56 is dragged inside the compartment 58 in an axial direction according to one of arrows AS. The sliding element 56 slides until the rotation of the steering wheel hub 14 stops or until a further movement is blocked by an abutment of the sliding element 56 with one of the two end stop surfaces 60, 62. Blocking of further axial movement of the sliding element 56 consequently blocks further rotation of the steering wheel hub 14 and thus of the steering wheel 12 in a direction of rotation that would cause a further axial movement of the sliding element 56 towards the currently blocking end stop surface 60, 62.

As indicated in FIG. 7A, the sliding element 56 has an axial width W. The axial width W of the sliding element 56 determines the free space inside the compartment 58 between the sliding element 56 and the end stop surfaces 60, 62. Thus, by adapting or choosing the axial width W of the sliding element 56, the maximum travel distance, i.e. the maximum axial movability, of the sliding element 56 between the two end stop surfaces 60, 62 is adjustable. Thus, by merely replacing the sliding element 56 and adapting its axial width W and the dimensions and geometry of the projection 64, the steering wheel rotation limiting device 56 can be used flexibly for different vehicle configurations. In particular, the axial width W can be chosen in accordance with one or more of the following parameters: a length of the spiral groove 66, a pitch of the spiral groove 66, a distance between the two opposing end stop surfaces 60, 62, and a circumferential length of the steering wheel hub 14.

An abutment of the sliding element 56 with end stop surface 60 is shown in FIGS. 8A, 8B and 9A. In this position, the sliding element 56 can only slide in direction towards the opposing end stop surface 62. I.e. in this position, the steering wheel hub 14 and the steering wheel 12 can only rotate in one particular direction of rotation, which causes the sliding element 56 to move towards the opposing end stop surface 62. A position in which the sliding element 56 can freely slide in both axial directions is shown in FIGS. 8C, 8D and 9B. I.e. in this position, the steering wheel hub 14 and the steering wheel 12 can freely rotate in both directions of rotation. An abutment of the sliding element 56 with opposing end stop surface 62 is shown in FIGS. 8E, 8F and 9C. In this position, the sliding element 56 can only slide in direction towards the end stop surface 60. I.e. in this position, the steering wheel hub 14 and the steering wheel 12 can only rotate in one particular direction of rotation, which causes the sliding element 56 to move towards the end stop surface 60.

As can be seen at least in FIG. 9A, in a position in which the sliding element abuts one of the two opposing end stop surfaces, the projection 64 is still spaced from the closest end portion 88 of the spiral groove 66. Hence, restriction of rotation of the steering wheel hub 14 is not caused by an abutment of the projection 64 with the end portion 88 of the spiral groove 66, but instead by an abutment of the sliding element 56 with one of the two end stop surfaces 60, 62. This robust configuration prevents damage of the steering system 10, in particular of the spiral groove 66 and the projection 64, even under influence of strong external forces.

| List of reference signs | |
| --- | --- |
| 10 | steering system |
| 12 | steering wheel |
| 14 | steering wheel hub |
| 16 | fixing elements |
| 18 | armature |
| 20 | through bores |
| 22 | blind holes |
| 24 | steering system support column |
| 26 | aligned section |
| 28 | off-axis section |
| 30 | connection portion |
| 32 | first bearing arrangement |
| 34 | second bearing arrangement |
| 36 | protruding flange portion |
| 38 | circular ring-shaped portion |
| 40 | support bushing |
| 42 | inwardly protruding flange portion |
| 44 | torque feedback device |
| 46 | rotor |
| 48 | stator |
| L1 | first longitudinal axis |
| L2 | second longitudinal axis |
| W | axial width |
| 50 | stator windings |
| 52 | steering wheel rotation limiting device |
| 54 | base |
| 56 | sliding element |
| 58 | compartment |
| 60 | end stop surface |
| 62 | end stop surface |
| 64 | projection |
| 66 | spiral groove |
| 68 | screws |
| 70 | opening |
| 72 | electric machine phase connections |
| 74 | electric steering wheel angle sensor connections |
| 76 | control unit |
| 78 | steering wheel angle sensor |
| 80 | tubular telescope arrangement |
| 82 | vehicle support column |
| 84 | adjustment elements |
| 86 | internal space |
| 88 | end portion |
| A | axis of rotation |
| AS | axial direction |

What is claimed is:

1. A steering system for a vehicle, comprising:
a steering wheel hub configured to be directly or indirectly connected with a steering wheel, the steering wheel hub being rotatable about an axis of rotation;
a steering system support column comprising:
an off-axis section having a first longitudinal axis that is off-set to the axis of rotation; and
an aligned section having a second longitudinal axis that corresponds to the axis of rotation, wherein the steering wheel hub is rotatably mounted on the aligned section, while the off-axis section is axially spaced from the steering wheel hub; and
a torque feedback device comprising an electric machine having a rotor and a stator, the rotor being attached to the steering wheel hub so as to be rotatable with the steering wheel hub about the axis of rotation, and the stator being non-rotatably fixed to the aligned section of the steering system support column, wherein the rotor is an outer rotor and the stator is an inner stator, wherein the off-axis section and the aligned section are connected by a connection portion, the connection portion extends transversally to both the first longitudinal axis and the second longitudinal axis.

2. The steering system of claim 1, wherein at least one of the off-axis section, the aligned section, or the connection portion is tubular, and has polygon shaped cross-section or circular cross-section.

3. The steering system of claim 1, wherein the steering system support column comprises an opening, which provides access to electrical connections.

4. The steering system of claim 1, further comprising an electronic control unit at least for at least one of controlling the torque feedback device or receiving and transmitting sensor information, the electronic control unit being arranged inside the off-axis section of the steering system support column.

5. The steering system of claim 1, further comprising a steering wheel rotation limiting device for limiting rotation of the steering wheel hub, the steering wheel rotation limiting device being attached to a non-rotatable component of the steering system support column via a base of the steering wheel rotation limiting device.

6. The steering system of claim 5, the steering wheel rotation limiting device further comprises a sliding element, and the steering wheel rotation limiting device engages the steering wheel hub via the sliding element.

7. The steering system of claim 6, wherein the base of the steering wheel rotation limiting device comprises two opposing end stop surfaces, and the sliding element is axially slidable parallel to the axis of rotation relative to the base and relative to the steering wheel hub between the two opposing end stop surfaces;

wherein a rotation of the steering wheel hub causes an axial movement of the sliding element, so that an abutment of the sliding element with one of the two end stop surfaces blocks the axial movement of the sliding element and the rotation of the steering wheel hub.

8. The steering system of claim 6, wherein the sliding element engages the steering wheel hub through a projection-and-groove engagement.

9. The steering system of claim 8, wherein the sliding element comprises a projection that engages a spiral groove formed on a circumferential surface of the steering wheel hub.

10. The steering system of claim 5, wherein the non-rotatable component is the off-axis section or the aligned section.

11. The steering system of claim 5, wherein the steering wheel rotation limiting device is arranged radially offset to the steering wheel hub.

12. The steering system of claim 1, wherein the first longitudinal axis is parallel to the axis of rotation.

13. The steering system of claim 3, wherein the opening of the steering system support column is arranged in the off-axis section or the connection portion.

14. The steering system of claim 1, wherein the steering system support column is attached to a vehicle body via a vehicle support column, wherein the off-axis section of the steering system support column is mounted in the vehicle support column so as to be translationally movable, non-rotatable and non-pivotable relative to the vehicle support column.

15. The steering system of claim 14, wherein the steering system support column forms an inner member of a tubular telescope arrangement and the vehicle support column forms an outer member of the tubular telescope arrangement.

16. The steering system of claim 14, wherein the vehicle support column is adjustable relative to the vehicle body by being at least one of pivotable or radially displaceable relative to the vehicle body.

17. The steering system of claim 1, further comprising auxiliary components which are arranged inside the aligned section of the steering system support column, the auxiliary components comprising in particular at least one of an airbag module, switchgear controls, a driver display arrangement, or a wiring harness.

18. The steering system of claim 1, wherein the aligned section of the steering system support column comprises a protruding flange portion that provides a first bearing surface for a first bearing arrangement arranged between the steering system support column and the steering wheel hub.

19. The steering system of claim 1, wherein the aligned section of the steering system support column comprises a circular ring-shaped portion that provides a second bearing surface for a second bearing arrangement arranged between the steering system support column and the steering wheel hub.

* * * * *